Nov. 10, 1964      N. A. MALKO      3,156,067
BALL BALANCE TESTING DEVICE
Filed Oct. 25, 1961      3 Sheets-Sheet 1
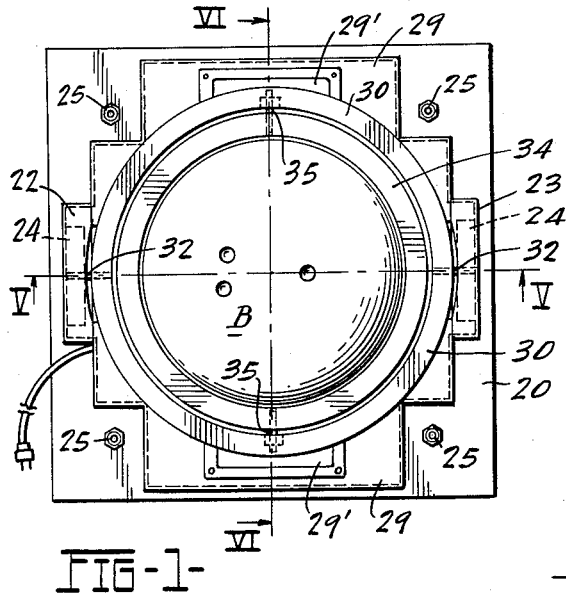
FIG-1-
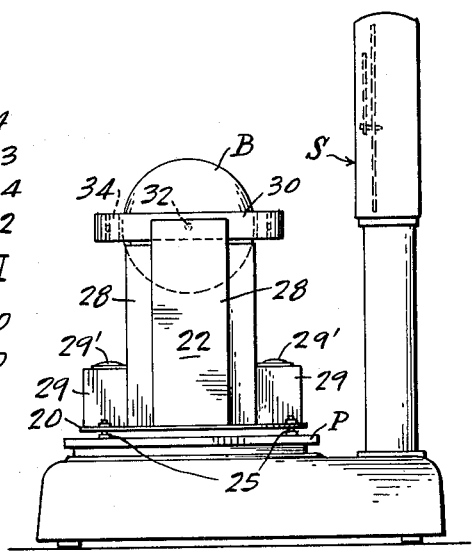
FIG-4-
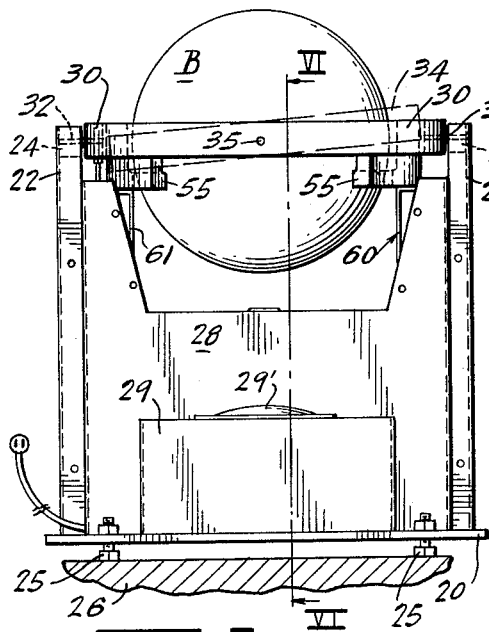
FIG-2-
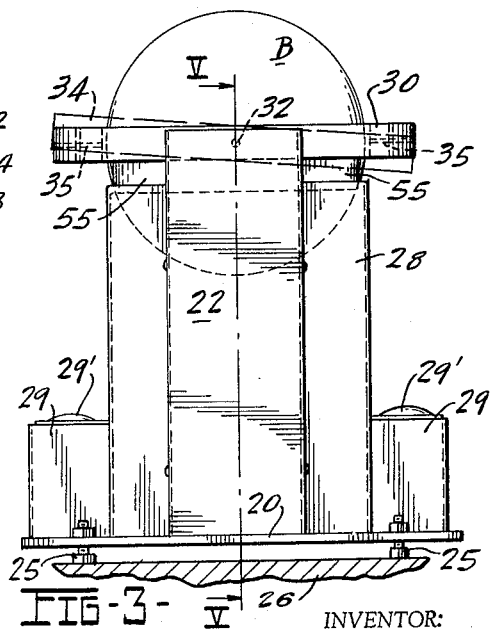
FIG-3-
INVENTOR:
NICHOLAS A. MALKO.
BY
ATT'Y.

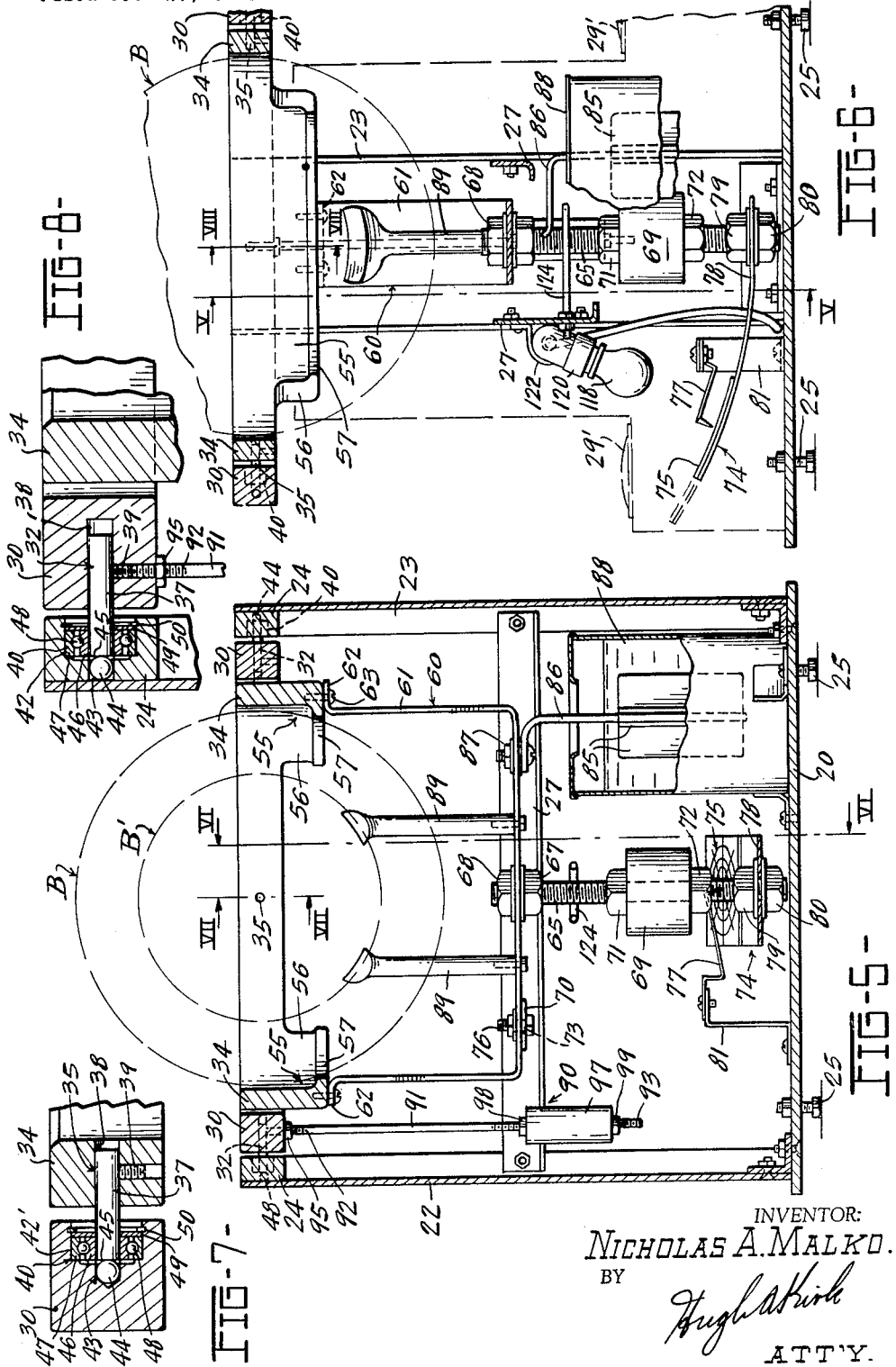

Nov. 10, 1964    N. A. MALKO    3,156,067
BALL BALANCE TESTING DEVICE
Filed Oct. 25, 1961    3 Sheets-Sheet 3
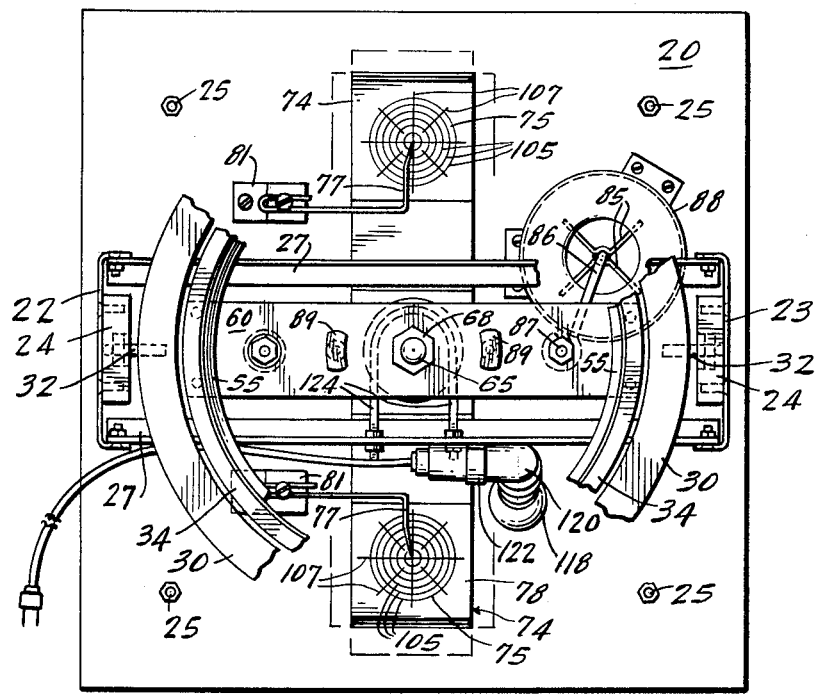
FIG-9-
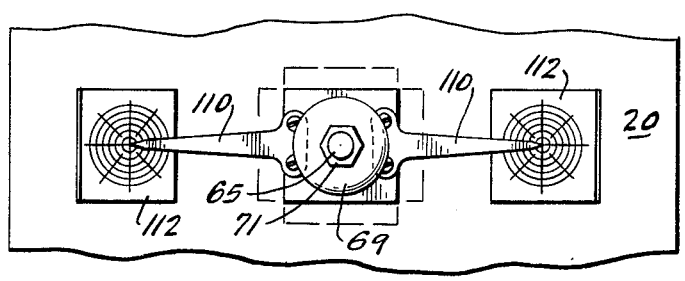
FIG-10-
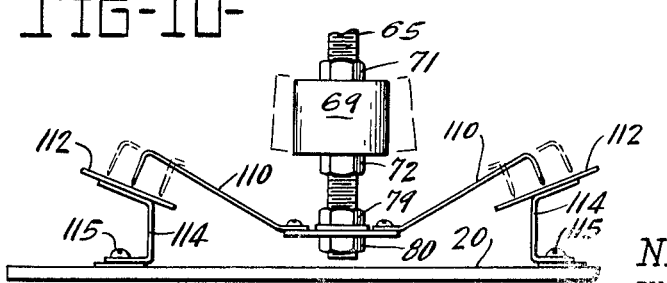
FIG-11-
INVENTOR:
NICHOLAS A. MALKO
BY
[signature]
ATT'Y.

United States Patent Office 3,156,067
Patented Nov. 10, 1964

3,156,067
BALL BALANCE TESTING DEVICE
Nicholas A. Malko, 1723 Potomac Drive, Toledo 7, Ohio
Filed Oct. 25, 1961, Ser. No. 147,523
20 Claims. (Cl. 73—483)

This invention relates to a device for checking the balance of spherical objects, such as bowling balls, and is particularly directed to mechanism for determining the distribution of weight with respect to the geometrical center of such objects.

Bowling balls are normally manufactured so that the center of weight is toward the "top" of the ball, or in other words in the area of the ball intended to be drilled with finger holes. Occasionally insufficient or too much weight is removed by drilling the finger holes to compensate for this initial unbalanced condition and the ball is not in proper balance. To test balls for this and/or other unbalanced conditions has been difficult and for the most part very unsatisfactory. By means of the present invention, however, the amount and location of any weight off-center can be readily and accurately determined.

An object of the invention is to provide a simple, efficient, effective and economic device for determining the center of weight distribution and visually indicating the direction and amount of off-center weight in a spherical object when in any one given position on the device.

A further object of the invention is to provide a novel center of gravity locator with universally tiltable supporting means provided with anti-friction pivot means together with dampening means.

Another object of this invention is to provide on its universally tiltable supporting means, means for supporting different diameter spherical objects with their geometrical center located substantially at the intersection of the axes of the tiltable supporting means to determine the location of excess weight.

Another object of the invention is to provide a device of this character with easily readable chart means calibrated in ounces and direction, such chart means being either single or dual so as to be located at one or both sides of the device.

Another object of the invention is to provide a device of the above type having an adjustable weight means connected to its universally tiltable object supporting means to vary the displacement of said object supporting means to fit the calibrations of its indicating means.

Generally speaking, the testing device of this invention comprises a normally horizontal base or plate having feet in the form of adjusting screws, a pair of spaced uprights or supports to the upper ends of which is pivotally connected an outer ring of a gimbal which outer ring in turn pivotally supports at right angles to the pivot of said outer ring, an inner gimbal ring provided with means for supporting the spherical objects to be tested in such position that geometrical center of the object is substantially at the intersection of the axes of said rings. Means connected to the inner ring carries a movable element which cooperates with a fixed element on the base to visually indicate the state of balance of the rings and objects supported thereby. Dampening means may be provided to check the oscillations of the rings to facilitate direct reading of the indicator. A pendulum carrying an adjustable weight is connected to the inner ring to oppose and vary the displacement of the inner ring to fit the calibrations of the visual indicating means. Additional pendular weight means may be provided on the outer ring to vary its displacement and restrict its sensitivity so as to produce equal displacement of both rings in all directions so concentric circular calibrations can be used on the indicator chart.

The device also may be enclosed in a housing to protect its mechanism. The indicating means may be illuminated and/or provided with a magnifying lens to facilitate its reading. The whole device may be mounted on a scale for simultaneously determining the weight of the spherical object as well as its balance. Limiting means may also be provided for limiting the movement of the gimbal rings beyond or at the limits of the scale provided for the indicator.

The above mentioned and other features and objects of this invention and the manner of attaining them will become more apparent and the invention itself will be best understood by reference to the following description of embodiments of the invention taken in conjunction with the accompanying drawings, wherein:

FIG. 1 is a top plan view of one embodiment of the ball balance testing device of the present invention supporting a bowling ball;

FIG. 2 is a front elevation of the device shown in FIG. 1;

FIG. 3 is a side elevation of the device shown in FIG. 1;

FIG. 4 is a side elevational view showing the device of FIG. 3 on a reduced scale resting on the platform of a weighing scale with which it may be used;

FIG. 5 is an enlarged vertical sectional detail view taken along line V—V of FIGS 1 or 3 with parts broken away, illustrating the ball supporting means for two different sized balls (shown in dotted circles), and the adjustable pendular weights and dampening means of the invention;

FIG. 6 is an enlarged fragmentary detail view taken substantially on a line VI—VI of FIG. 1, 2 or 5 showing one form of indicia means of the invention and in the foreground a part of the dampening means;

FIG. 7 is an enlarged fragmentary sectional detail of one of the inner gimbal rings pivotal support taken substantially on a line VII—VII of FIG. 5;

FIG. 8 is an enlarged fragmentary sectional detail of one of the outer gimbal rings pivotal support taken substantially on a line VIII—VIII of FIG. 6;

FIG. 9 is an enlarged horizontal detail view similar to FIGS. 1, 5 or 6 with portions broken away to illustrate features of a dual indicia means;

FIG. 10 is a plan view similar to part of that of FIG. 9 showing a modified indicia means; and FIG. 11 is a side view of the modified indicia means shown in FIG. 10.

Referring to the drawings and particularly to FIGS. 1 through 4, the device of the present invention is shown as including a base member or plate 20 upwardly from which extend a pair of spaced channel-shaped supports 22 and 23. A plurality of leveling means or screws 25 serve to position the device on a table or other suitable support 26, there preferably being four such leveling screws 25. This support 26 may also comprise the platform P of a scale S as shown in FIG. 4 so that the weight of the object or ball B being tested can simultaneously be determined. The upright supports 22 and 23 may be braced and connected together by bridging or cross members 27 (see FIGS. 5, 6 and 9). A closure or housing 28 may be provided to enclose the mechanism presently to be described, the housing being of generally U-shape and provided with extensions or side compartments 29 having transparent closures or magnifying viewing lenses 29' in the top thereof through which the indicia means, to later be described is readily visible.

Adjacent the upper inner ends of supports 22 and 23 are blocks 24 (FIGS. 5 and 8) which support or suspend the outer gimbal ring 30 through the medium of anti-friction pivot means 32 located in diametrically opposed relation. Pivot means 32 permit free rocking movement of ring 30 with respect to supports 22 and 23, the ring 30 in turn pivotally supporting an inner gimbal ring 34 by anti-friction pivot means 35 which are also diametrically opposed and arranged at right angles to the pivot means 32. Pivot means 32 and 35 are of similar construction and include pivot pins 37 (FIGS. 7 and 8) fixed at one end in holes 38 in rings 30 and 34, respectively, by set screws 39. The other ends of pins 37 are supported by bearings 40 in apertures 42 and 42' in block 24 and ring 30, respectively. The apertures 42 have a central hole 43 in their bottoms in each of which a ball thrust bearing 44 is located to bear against the end surfaces 45 of pins 37. Bearings 40 are inclusive of inner 46 and outer 47 races between which a plurality of balls 48 are located, the bearings 40 being retained in apertures 42 and 42' by washers 49 and snap rings 50.

In order to position the spherical object being tested so that its geometrical center is substantially at the intersection of the pivotal supporting axes of the gimbal rings 30 and 34, means have been provided to support such objects. In one form such means may be formed integrally with the inner ring 30 and includes oppositely disposed dropped ring portions 55 provided by partly cylindrical depending sections 56 having inturned flanged edges 57 for engaging and locating the outer spherical surface of the ball B.

Fixed to inner ring 34 is a generally U-shaped bracket or yoke member 60 the upstanding legs 61 of which are flanged at 62 and secured to portions 55 of ring 34 such as by means of screws 63 (FIG. 5). Centrally of bracket 60 may be a spindle 65 threaded throughout its length to receive nuts 67 and 68 for securing the spindle to the bracket 60. Adjustably mounted on the spindle 65 is a pendular weight member 69 to oppose and vary the displacement of the rings 30 and 34 to fit the calibrations of the indicating means 75. Upper 71 and lower 72 adjusting nuts are provided to locate the weight 69 with respect to the spindle 65 for such adjustment. A counter balance for the dampening means 85 may be provided on bracket 60 in the form of a washer-like weight 70 (FIG. 5) having an aperture 73 of sufficient diameter to permit its adjustment with respect to the bolt and nut assembly 76 which secures the weight 70 in adjusted position. The bracket 60 and spindle 65 together provide a pendulum which spindle additionally may serve to carry one element of an indicating means 74, such as chart or scale 75 which, in cooperation with a fixed pointer 77, visually indicates the state of balance of the rings 30 and 34 as well as of an object supported thereby for test purposes. As shown in FIG. 6 of the scale 75 may be mounted on an arcuate plate 78 fixed adjacent the end of spindle 65 by nuts 79 and 80, and the pointer 77 may be attached to a bracket 81 in turn fixed to base plate 20 or other stationary part of the device.

To dampen the oscillations of the pendulum, a multivaned member 85 may be provided on the lower end of a dampener arm 86 fixed such as by a bolt and nut means 87 to bracket 60, arm 86 extending outwardly and downwardly from bracket 60 to project the member 85 into a container or receptacle 88 removably secured to the plate 20 out of the path of movement of the pendulum and having a viscous fluid therein to yieldingly resist movement of the member 85 and thus the pendulum.

An alternate form of ball support may be used with the device as shown in FIG. 5 and is inclusive of a pair of spaced pedestals 89 removably secured such as by screws to bracket 60 and having their upper ends arcuate shaped to conform to the surface of the spherical object to be supported. Such arrangement has particular utility when used to support balls B' of smaller diameter than those accommodated by the supports 55, and pedestals 89 of various heights may be used to adapt the device to wider use to support different diameter objects so that their geometrical centers are in desired position.

The outer ring 30 is also provided with a pendulum 90 (FIG. 5) which includes a rod 91 having threaded end portions 92 and 93. As shown in FIG. 8 the end portion 92 may be threaded into the set screw hole and is retained by a nut 95 which arrangement also may serve as a locking means for the set screw 39. At the other end 93 of rod 91 is adjustably positioned a weight 97 lockable in adjusted position by upper 98 and lower 99 nuts. Such pendulum 90 has been found desirable further to oppose and vary the displacement of the outer ring 30 which has a greater lever arm for its additional mass than the lever arm for the mass of the inner ring and its supporting means, and to compensate for the unsymmetrical distribution of the mass in the ball supporting member so that the inner and outer rings 30 and 34 will produce equal displacements in all directions, and so that a circular scale on the indicator 75 may be used. The reason for this difference in lever arms is because the pivotal fulcrum supports for the weight of he inner and outer rings are by necessity of the structure of a gimbal, at different radial distances from the geometric center of the gimbal, namely one pivot is inside the outer ring and the other pivot is outside the outer ring.

As particularly shown in FIG. 9, the indicia 74 may be located on both and opposite sides of the device and includes charts 75 which may consist of a plurality of concentric circles or graduations 105. For indicating the condition of balance of bowling balls, it is desirable that the chart 75 be graduated in ½ inch-ounce increments up to four inch-ounces and in inch-ounce graduations thereafter. Additionally, the chart 75 may be provided with straight markings 107 extending radially outwardly from the center of the circles 105 in equally spaced relation. Thus the pointer 77 cooperates with the chart to indicate the angular direction and the amount of unbalance of the ball in that one specific position on the supporting means 60, the chart 75 moving in the same direction to that of the over weight portion of the ball B or B' in that position, with the amount being indicated by the graduation underlying the pointer 77.

Alternatively, as shown in FIGS. 10 and 11, the pointer or pointers 110 may be affixed to the pendulum 65 to move therewith and cooperate with a fixed scale or chart means 112 to provide a readily readable indication of the condition of balance of the ball B or B', in which the direction of unbalance of the ball is directly opposite from that shown on the scale or chart 112, as distinguished from the direct reading chart 75 shown in FIGS. 5 and 6 described above. In this instance, the charts 112 are affixed to brackets 114 in turn mounted on the base 20 by means such as screws 115.

A suitable light source such as bulb 118 (FIG. 9) in socket 120 affixed to cross member 27 by removable bracket 122 may be used to illuminate the chart 75 or 112.

A U-shaped rod means 124 (FIGS. 5, 6 and 9) also may be attached to one of the cross members 27 to surround and limit the movement of the spindle 65 and in turn the movement of the pendulum 69 and gimbal rings 30 and 34.

In use, the device of the present invention is first accurately leveled through the use of the leveling screws 25 on its base 20, a level condition of the gimbals 30 and 34 being determined by visual reference to the pointer 77 to the center of the scale 75. When the device is used in combination with a weighing scale S as in FIG. 4, it is leveled on the scale platform P. Thereafter, a bowling ball B or B' or other spherical object, the weight distribution of which is to be determined, is placed in the inner gimbal ring 34 so that the "top" of or finger holes in the ball is uppermost and so that the axes of the rings pass through the center of the ball. If the ball is out of balance when in this position, for example, more weight off center in a particular direction, the amount of the excess weight in such direction is determined by visual reference to the pointer 77 and scale 75 which indicia provides a reading either in the same or opposite direction to that in which the over weight occurs, depending upon whether the chart is attached to the movable structure or to the base member, respectively. However, such indication does not show whether the excess weight is in the upper or lower half of the ball nor how far its center of mass is from the geometric center of the ball. To complete the test, the ball is then rotated 90° around a horizontal axis toward or away from the previously indicated direction of unbalance to determine another reading of direction and amount. Then from both sets of readings the exact location and amount of the unbalance of the ball can be determined.

While there is described above the principles of this invention in connection with specific apparatus, it is to be clearly understood that this description is made only by way of example and not as a limitation to the scope of this invention.

What is claimed is:

1. A device for testing the balance of bowling balls comprising:
   (a) means for universally tiltingly supporting a bowling ball so that its geometrical center is at the axes of tilt of said supporting means,
   (b) means to oppose and vary displacement of said supporting means comprising a bracket fixed to said supporting means and an adjustable pendular weight depending from said bracket,
   (c) means fixed to said bracket to dampen the oscillations thereof, and
   (d) means fixed to said bracket and cooperating with a stationary object of said supporting means, said indicating means including a chart having distance-weight graduations.

2. A device according to claim 1 wherein said means for universally tiltingly supporting a bowling ball comprises a pair of gimbal rings.

3. A device for testing the unbalance of spherical objects comprising:
   (a) a base having a pair of spaced vertical supports,
   (b) a gimbal having inner and outer horizontally pivoted rings mounted between said supports,
   (c) means mounted in said inner ring for supporting the spherical object to be tested so that its geometrical center lies substantially at the center of said ring,
   (d) means connected to said gimbal to oppose its displacement, and
   (e) unbalance indicating means having cooperating parts separately connected to said inner ring and said base.

4. A device according to claim 3 including a weighing scale for weighing the spherical object and means on said base for supporting said device on said scale.

5. A device according to claim 4 including means for adapting said inner ring object supporting means for supporting spherical objects of different diameters.

6. A device according to claim 4 including means connected to said inner ring for dampening the movement of said gimbal.

7. A device according to claim 6 wherein said dampening means comprises a vane connected to said inner ring, and a reservoir of viscous liquid mounted on said base into which said vane is suspended.

8. A device according to claim 3 wherein said displacement opposing means comprises a pendulum mounted to said inner ring.

9. A device according to claim 8 wherein the mass of said pendulum is adjustable to and from the center of said rings.

10. A device according to claim 3 including means for improving the visibility of said indicating means comprising a magnifying lens.

11. A device according to claim 3 including means for improving the visibility of said indicating means comprising means for illuminating said indicating means.

12. A device according to claim 3 including a pair of said indicating means, one mounted on each side of said device.

13. A device according to claim 3 wherein said inner and outer rings are mounted in frictionless pivots along perpendicular axes in the same horizontal plane.

14. A device according to claim 3 wherein said base includes adjustable means at its corners for levelizing said device.

15. A device for testing the balance of spherical objects comprising:
   (a) a base member,
   (b) a pair of upright supports fixed to said base member,
   (c) a universally tiltable support including inner and outer gimbal rings pivoted to said upright supports,
   (d) means associated with said base member for leveling said tiltable support to zero position,
   (e) means for positioning the spherical object with its geometrical center substantially at the cross point of the axes of said gimbal rings,
   (f) means connected to said rings for opposing their displacement, and
   (g) means for indicating both the direction and the amount of unbalance of said object in a given position on said tiltable support, said indicating means comprising a member movable with said tiltable support, and a second member fixed with respect to said tiltable support.

16. A device according to claim 15 wherein said movable member is a chart and said second member is a pointer.

17. A device according to claim 15 wherein the movable member is a pointer and said second member is a chart.

18. A mechanism for determining the center of weight distribution of a spherical object comprising:
   (a) a horizontally disposed base structure,
   (b) means for leveling said base structure,
   (c) a pair of vertically disposed supports connected to said base structure,
   (d) a universally tiltable support including inner and outer gimbal rings pivoted to said vertical supports and means for positioning said spherical object within said inner gimbal ring so that the geometrical center of said spherical object is substantially at the cross point of the axes of said gimbal rings,
   (e) pendulum means including an adjustable weight connected to said inner gimbal ring for opposing displacement of said support,
   (f) dampening means to stabilize said tiltable support and pendulum means,
   (g) first and second indicia means for indicating values from which the direction and amount of unbalance of an object positioned in said tiltable support can be determined, one of said indicia means being movable with said pendulum means and the other of said indicia means being attached to said base structure.

19. A device for testing the unbalance of spherical objects comprising:
   (a) a pair of base supports,
   (b) an outer gimbal ring pivotally supporting along its diameter between said supports,
   (c) an inner gimbal ring pivoted inside said outer ring along its diametrical axis at right angles to that axis of pivot of said outer ring, (d) means inside said inner ring for supporting said spherical objects whereby their geometric center lies substantially at the cross point of said two axes, (e) indicator means attached to said inner ring for indicating with respect to said supports both the amount and direction of unbalance of said objects in any one position on said inner ring supporting means, (f) means connected to the inner ring for dampening the movement of said ring about said axis, and (g) separate means connected to said rings for opposing their displacement.

20. A device according to claim 19 including means for adjusting said displacement opposing means to fit the calibrations of said indicator means.

References Cited in the file of this patent

UNITED STATES PATENTS

| | | |
|---|---|---|
| 1,091,708 | Riddell | Mar. 31, 1914 |
| 1,136,611 | Pomeroy | Apr. 20, 1915 |
| 2,220,404 | Hulslander | Nov. 5, 1940 |
| 2,265,897 | De Ghetto | Dec. 9, 1941 |
| 2,338,057 | Petersen | Dec. 28, 1943 |
| 2,722,827 | Spencer | Nov. 8, 1955 |
| 2,940,315 | Rued | June 14, 1960 |

OTHER REFERENCES

Pages 688–689, Aug. 1954, issue of Rubber Age. Article entitled "Manufacture of Bowling Balls at Stowe-Woodward."